United States Patent [19]
Blumenau

[11] Patent Number: 6,067,199
[45] Date of Patent: May 23, 2000

[54] METHOD AND APPARATUS FOR INCREASING DISC DRIVE PERFORMANCE

[75] Inventor: Steven M. Blumenau, Holliston, Mass.

[73] Assignee: EMC Corporation, Hopkinton, Mass.

[21] Appl. No.: 08/885,639

[22] Filed: Jun. 30, 1997

[51] Int. Cl.[7] .................................................... G11B 5/09
[52] U.S. Cl. ............................................................ 360/48
[58] Field of Search .......................... 360/48, 8; 386/33, 386/101, 109, 112; 707/101

[56] References Cited

U.S. PATENT DOCUMENTS

| | | | |
|---|---|---|---|
| 5,237,640 | 8/1993 | Miller et al. | 360/48 |
| 5,666,114 | 9/1997 | Brodie et al. | 341/50 |
| 5,809,295 | 9/1998 | Staub et al. | 395/601 |

*Primary Examiner*—Thang V. Tran
*Assistant Examiner*—Regina Y. Neal
*Attorney, Agent, or Firm*—Wolf, Greenfield & Sacks, P.C.

[57] ABSTRACT

A method of managing information to be stored on a storage disc in a disc drive system to achieve improved system performance. Some of the data on the disc may be mirrored on the same surface of the disc to reduce latency and/or seek time. Compression techniques may be employed to limit reductions in the storage capacity of the disc. In another embodiment, data is preferentially stored on the outer tracks of the disc because system performance is greater when accessing outer tracks. Compression techniques may also be employed with this embodiment to limit reductions in the storage capacity of the disc. Compressed data stored on the disc may be transferred to another storage medium in its raw compressed form to reduce the number of instructions that would be required to transfer the data if it were decompressed before transfer.

36 Claims, 8 Drawing Sheets

METHOD AND APPARATUS FOR INCREASING DISC DRIVE PERFORMANCE

BACKGROUND OF THE INVENTION

1. Field of the Invention

The present invention relates to disc drive storage systems.

2. Discussion of the Related Art

Disc drives are used in many different types of computer or data processing systems to store data. Disc drive systems include one or more discs of a recording medium (e.g., a magnetic recording medium or an optical recording medium) on which information can be written for storage purposes, and from which stored information can be read. The recording medium is typically in the form of a disc 1 as shown in FIG. 1. The disc includes a plurality of tracks on which information is recorded. In FIG. 1, only an outer track 3 and an inner track 5 are shown to simplify the drawing. However, it should be appreciated that a surface of an actual recording disc will include a large number of tracks (e.g., a 9GB drive includes over 5,000 tracks) in addition to the outer and inner tracks 3, 5. In a disc drive that includes multiple discs, the discs are conventionally stacked so that corresponding tracks on the discs overlie one another.

As shown in FIG. 1, each of the tracks is conventionally subdivided into a plurality of sectors 7 (also know as blocks). The sectors 7 define the smallest amount of data that is written to or read from the disc in one operation. An exemplary size for each sector is 512 bytes, which is the standard for disc drives that communicate with other components of a data processing system over a SCSI interface.

Data is read from and written to the disc 1 using a head 9 that is positioned adjacent (e.g., above) the surface of the disc via an arm 11. In operation, the disc is rotated at a high rate of speed (e.g., 5,400 rpm, 7,200 rpm or 10,033 rpm). The arm 11 is pivoted by an actuator (not shown) about a pivot point 12 to move the head 9 in a seek direction (indicated by the arrow S in FIG. 1) so that the head can be positioned above any of the tracks 3, 5 of the disc. The combination of the rotation of the disc and the movement of the head 9 in the seek direction S enables the head to be positioned adjacent any sector 7 of the disc to access (i.e., read information from or write information to) that sector.

The performance of a disc drive system is largely impacted by three system characteristics, i.e., seek time, latency and data rate. The seek time relates to the delay incurred in positioning the head 9 above the appropriate track. In the worst case, the seek time is defined by the delay incurred in moving the head 9 between the inner and outer tracks 5, 3. The latency of the system is the time it takes for the rotation of the disc 1 to bring the desired sector 7 to a position underlying the head 9. The worst case latency is defined by the time it takes to complete a single rotation of the disc. Finally, the data rate of the system relates to how quickly data can be read from or written to the disc once the head 9 is positioned above the appropriate sector 7. The data rate is dependent upon the bit density of the information stored on the disc, the rate of rotation of the disc and the disc drive electronics that process the data.

Most conventional disc drive systems attempt to maximize the storage capacity of the disc 1. Thus, the disc 1 is typically provided with as many tracks as possible, and each track is provided with as many sectors as possible. Although maximizing storage capacity, such configurations result in limitations being placed on the performance of the system. For example, maximizing the number of tracks on the disc results in a long worst case seek time, because the head 9 must move across substantially the entire radius of the disc.

In addition, the relative performance of the disc drive system is greater when accessing tracks that are positioned nearer the outer surface of the disc (e.g., track 3) than the center of the disc (e.g., track 5). Many disc drive systems employ a technique known as zoned constant velocity in which the total disc capacity is increased by varying the number of sectors per track with the distance of the track from the center of the disc. This technique is also called zone bit recording. A drive that employs this technique is known as a notched drive according to the SCSI specification. The tracks are typically grouped into zones with each track in a zone including the same number of sectors. Outer tracks have more sectors than inner tracks. As a result, when the disc rotates, the rate of data passing by the head when accessing the outer track 3 is significantly greater than when accessing the inner track 5, because the outer track moves past the head at a significantly faster speed and has more sectors per track. Thus, the data rate of the system is greater when reading a track positioned near the outer surface of the disc. In addition, since the outer track 3 may have relatively more information stored thereon, less seeking between tracks is required when accessing the outer tracks.

As should be appreciated from the foregoing, when the entire surface of the disc is used to support tracks in a conventional implementation as shown in FIG. 1, the performance of the disc drive system is limited by the poorer performance of the system when accessing the inner tracks.

In view of the foregoing, it is an object of the present invention to provide an improved method and apparatus for increasing disc drive performance.

SUMMARY OF THE INVENTION

One illustrative embodiment of the invention is directed to a method of managing information to be stored on a disc in a disc drive system, the disc having a surface including a plurality of information tracks, each of the tracks including a plurality of sectors, each sector for storing a block of information. The method comprises a step of writing at least one block of information to at least two sectors on the surface of the disc so that the surface of the disc includes two copies of the at least one block of information.

Another illustrative embodiment of the invention is directed to a disc drive, comprising at least one disc having a surface including a plurality of information tracks, each of the tracks including a plurality of sectors, each sector for storing a block of information; and a controller that writes at least one block of information to at least two sectors on the surface of the disc to create two copies of the at least one block of information on the surface of the disc.

A further illustrative embodiment of the invention is directed to a disc drive, comprising at least one disc having a surface including a plurality of information tracks, each of the tracks including a plurality of sectors, each sector for storing a block of information; and a head to access information on the at least one disc; wherein the disc drive has a disc rotation time to complete one full rotation of the at least one disc, and wherein the disc drive has a worst case latency that is substantially less than the disc rotation time.

Another illustrative embodiment of the invention is directed to a disc drive, comprising at least one disc having a surface including an information recording area on which information can be recorded, the information recording area including a plurality of information tracks, each of the tracks including a plurality of sectors, each sector for storing a block of information, the information recording area being defined between an inner disc radius and an outer disc radius. The disc drive further includes a head to access information in the information recording area. The disc drive has a head movement time to move the head between the inner disc radius and the outer disc radius, and a worst case latency that is less than the head movement time.

Another illustrative embodiment of the invention is directed to a storage disc for use in a disc drive system, the storage disc comprising a surface including a plurality sectors, each sector for storing a block of information, the plurality of sectors being arranged to form a plurality of tracks, each of the tracks including a number of the plurality of sectors. The surface further includes a first region that includes a first group of the plurality of sectors and a second region that includes a second group of the plurality of sectors, the first and second groups of the plurality of sectors storing common blocks of information such that the second region forms a mirror of the first region.

A further illustrative embodiment of the invention is directed to a storage disc for use in a disc drive system, the storage disc comprising a surface including a plurality of tracks, each track including a plurality of sectors, the surface further including an outer region that includes a first group of the plurality of tracks and an inner region that includes a second group of the plurality of tracks, the inner and outer regions each including a plurality of sectors. The surface further includes a plurality of sector sets that each includes an inner sector selected from one of the plurality of sectors in the inner region and a corresponding outer sector selected from one of the plurality of sectors in the outer region. Each of the plurality of sector sets includes one of an inner and outer sector that each stores a portion of a block of uncompressed information; an outer sector that stores a compressed block of information and an inner sector that is empty; and an inner and outer sector that each is empty.

Another illustrative embodiment of the invention is directed to a disc drive having a maximum storage capacity that defines a maximum number of bytes of information passed to the disc drive that can be stored within the disc drive. The disc drive comprises a storage medium including at least one disc, the storage medium having a maximum storage capacity of C bytes for information that is uncompressed; compression means for compressing information to be written to the storage medium at a minimum compression ratio equal to at least 2:1; and a controller that controls the writing of information to the storage medium so that the maximum storage capacity of the disc drive is limited to C bytes.

A further illustrative embodiment of the invention is directed to a method of managing information to be stored on at least one disc in a disc drive system, the at least one disc including a plurality of sectors that are arranged to form a plurality of tracks. The method comprises steps of: (A) forming a plurality of sector sets from the plurality of sectors, each sector set including a main sector and at least one corresponding extended sector; (B) when a block of information to be written to the disc drive is compressed by a sufficient amount that the block of information can be stored within one of the main sectors, storing the block of information in a compressed state in one of the main sectors and identifying the at least one extended sector corresponding to the one of the main sectors as being in an empty state; and (C) when a block of information to be written to the disc drive cannot be compressed by a sufficient amount to be stored within one of the main sectors, storing the block of information in an uncompressed state partially in one of the main sectors and partially in the at least one extended sector that corresponds to the one of the main sectors.

Another illustrative embodiment of the invention is directed to a disc drive, comprising at least one disc including a plurality of sectors that are arranged to form a plurality of tracks; and a controller that manages writing of blocks of information to the at least one disc, the controller being adapted to arrange the plurality of sectors in a plurality of sector sets, each sector set including a main sector and at least one corresponding extended sector, the controller being further adapted to manage the writing of blocks of information to the at least one disc so that when a block of information to be written to the disc is compressed by a sufficient amount that the block of information can be stored within one of the main sectors, the controller stores the block of information in a compressed state in one of the main sectors and identifies the at least one extended sector corresponding to the one of the main sectors as being in an empty state; and so that when a block of information to be written to the disc cannot be compressed by a sufficient amount to be stored within one of the main sectors, the controller stores the block of information in an uncompressed state partially in one of the main sectors and partially in the at least one extended sector that corresponds to the one of the main sectors.

A further illustrative embodiment of the invention is directed to a method of managing information to be stored on at least one disc in a disc drive system, the at least one disc having a maximum storage capacity that defines a maximum number C of bytes of information that can be stored on the at least one disc. The method comprises steps of: when at least one block of information to be written to the at least one disc is in a compressed state, writing the at least one block of information to at least one sector of the at least one disc that includes M bytes; and (B) decreasing a number of bytes in the at least one disc available for storing additional blocks of information by greater than M bytes, so that at least one of the C bytes of capacity of the at least one disc is made unavailable to store a block of information.

Another illustrative embodiment of the invention is directed to a method of managing a transfer of information from a first storage disc to a second storage disc, the first storage disc storing at least one byte of compressed information that was compressed prior to being stored on the first storage disc. The method comprises steps of: reading the at least one byte of compressed information from the first storage disc in its raw form, without decompressing the at least one byte of compressed information; and writing the at least one byte of compressed information to the second storage disc in its raw form, without decompressing the at least one byte of compressed information.

DETAILED DESCRIPTION OF THE INVENTION

The present invention provides a number of techniques for arranging information stored on a disc to increase the performance of the disc drive system. In some embodiments of the invention, preference is given to storing data in the outer tracks of the disc to increase system performance. However, other embodiments of the invention achieve improved performance in other ways. Some embodiments of the invention sacrifice some storage capacity of the disc to achieve performance improvements, while other embodiments employ compression techniques so that the increased system performance does not result in any loss of disc capacity. It should be understood that those embodiments of the invention that are directed to a disc drive can be employed in a disc drive system of any type, including systems that employ either a fixed or removable storage medium, and including systems that employ a write once read only media (e.g., CD ROM) or a media that can be written to multiple times.

Figure 2:
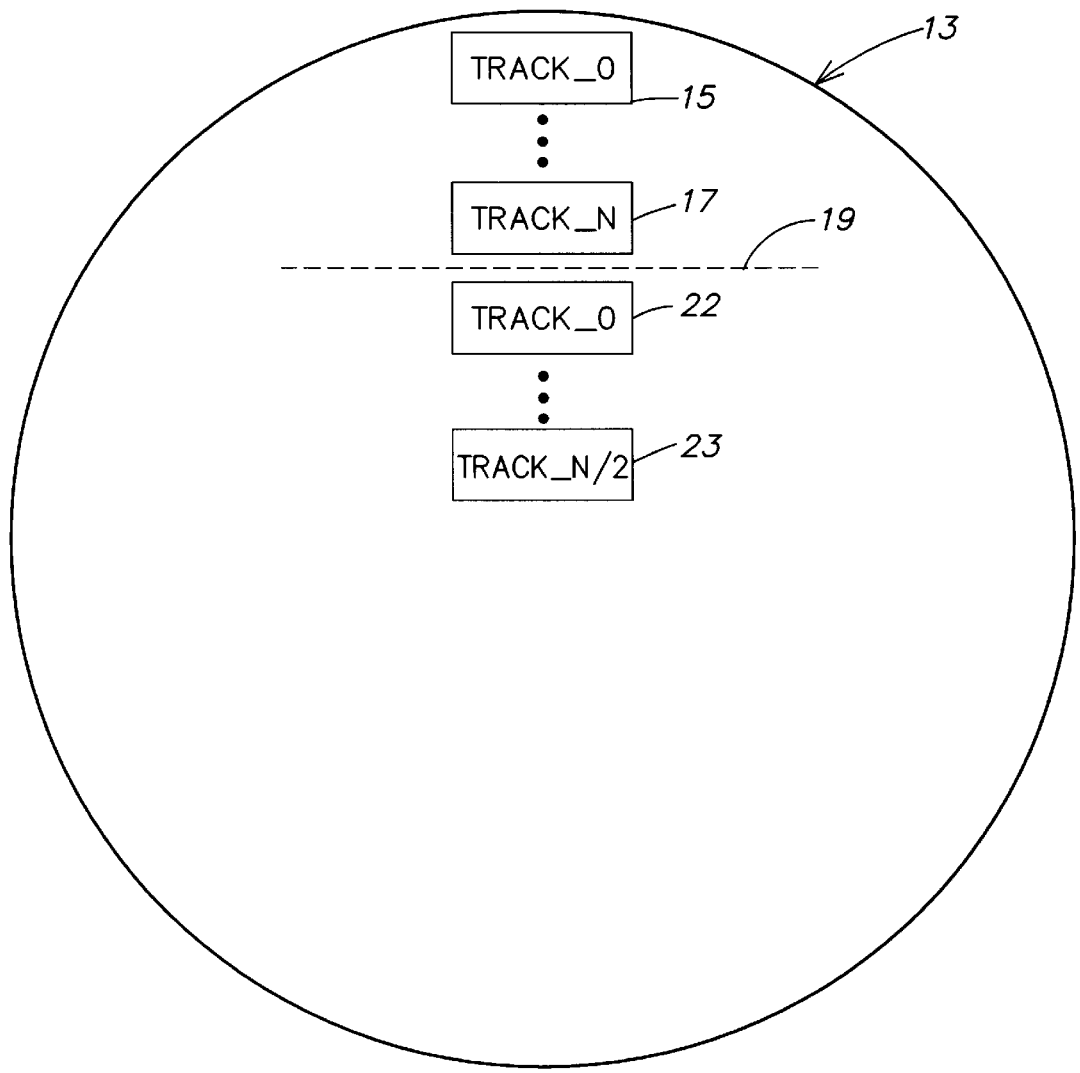
FIG. 2 illustrates one embodiment of the invention for achieving improved seek time in a disc drive.

One illustrative embodiment of the invention is shown in FIG. 2, which conceptually illustrates a disc 13 having a plurality of tracks including TRACK_0 15, TRACK_N 17 and a number of tracks disposed therebetween (indicated in FIG. 2 by three dots). In FIG. 2, the tracks are represented as rectangles along only a small portion of the disc for the sake of clarity in representation, but it should be appreciated that each of the tracks extends, about its particular radius, around the entire disc.

In the embodiment of the invention shown in FIG. 2, a number of mirror tracks are also provided on a mirrored portion of the disc indicated by the dotted line 19. The mirror tracks include a track 22 that is a mirror of TRACK_0 15, a TRACK_N/2 23 which is a mirror of a track halfway between tracks 15 and 17, and a number of mirror tracks disposed in between. The tracks disposed between tracks 22 and 23 include a mirror of each track disposed between TRACK_0 and the track halfway between TRACK_0 and TRACK_N. Thus, the mirrored portion 19 of the disc includes a mirror of the outer one-half of the tracks stored on the disc.

The configuration shown in FIG. 2 increases the performance of the disc drive system by reducing the average seek time of the drive. In particular, even in the worst case scenario, the head 9 (FIG. 1) need not travel across the entire radius of the disc; the worst case includes a seek from TRACK_0 15 to TRACK_N 17, or a seek from TRACK_N/2 23 to the next sequential track. Rather, the worst case seek would involve approximately only a ⅔ stroke, wherein a stroke defines a seek across the entire radius of the disc.

In addition to decreasing the worst case seek time, the configuration shown in FIG. 2 also increases performance of the system by significantly reducing the average seek time. This is achieved primarily by reducing seek times between outer and inner tracks, which are the longest seeks in a conventional system. For example, a seek between TRACK_0 and TRACK_N involves the minimal time necessary to seek one track using the configuration of FIG. 2 (i.e., from track 17 to mirror track 22), whereas in a conventional system such a seek would require a full stroke equaling the worst case seek time for the system.

In addition to the performance improvements described above, it should further be appreciated that the embodiment of FIG. 2 also increases the reliability of the disc drive. In particular, having a mirror for a number of the tracks enables the drive to automatically recover from a bad sector in one of the tracks that has a corresponding mirror.

Implementing the embodiment of FIG. 2 involves some reduction in the capacity of the disc 13 because of the use of the mirror tracks 22, 23. In addition, if a single mirror track is employed for each outer track, less information can be stored in each of the tracks that is mirrored, because the amount of information that can be stored on the track is limited by how much information its corresponding mirror can store. As discussed above, since the mirror tracks are disposed on a portion of the disc that has a smaller radius than the outer portions of the disc where the main tracks are stored, each mirror track may not be capable of storing as much information as its corresponding main track. However, in one embodiment of the invention, multiple mirror tracks can be employed to mirror each of the sectors in a corresponding main track, so that the capacity of the main track need not be reduced.

Figure 3:
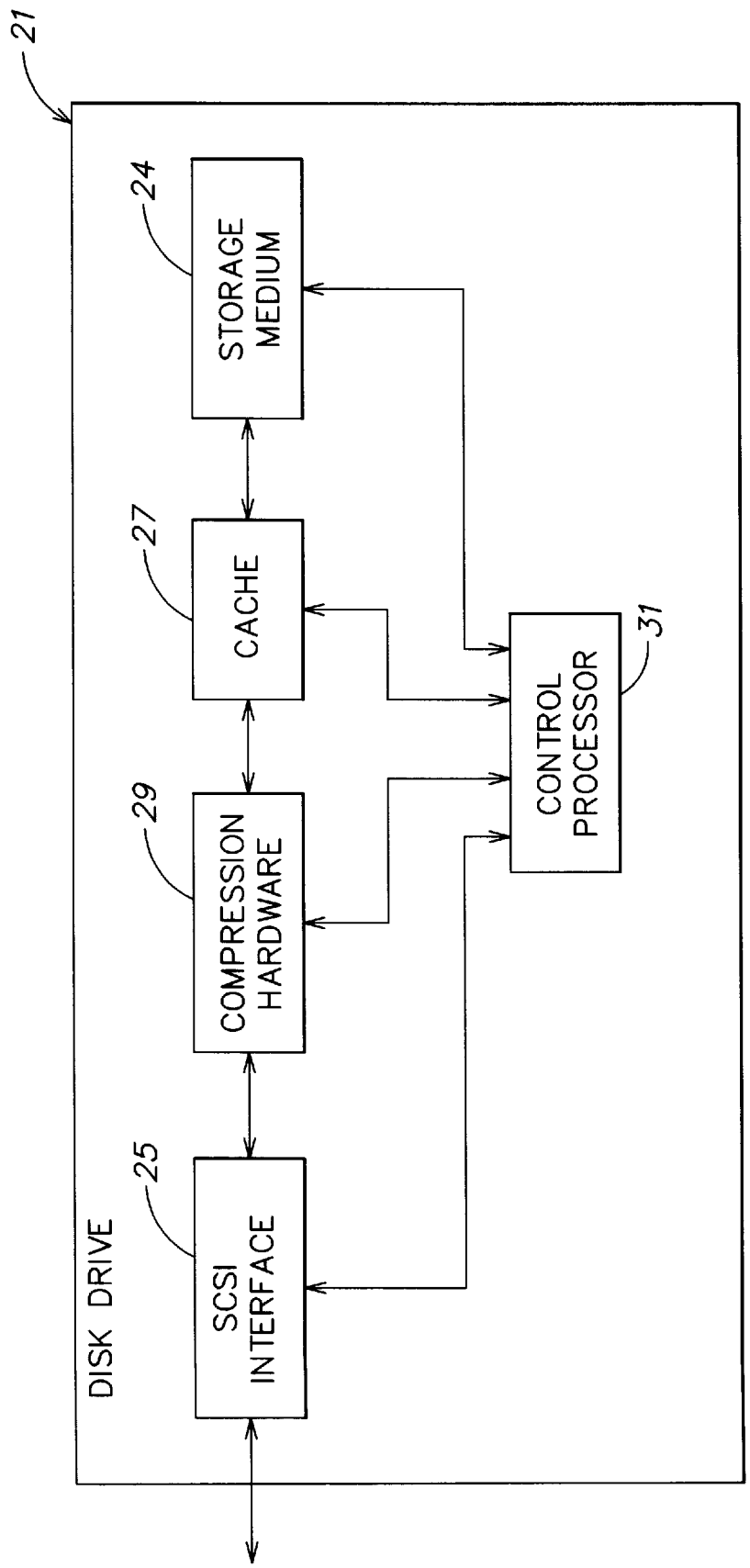
FIG. 3 is a block diagram illustrating a disc drive in accordance with one illustrative embodiment of the invention.

The embodiment of the invention shown in FIG. 2 can be implemented in a disc drive in a straightforward manner that should be immediately apparent to those skilled in the art. For example, a block diagram of a disc drive 21 that can be used to implement the feature of the present invention shown in FIG. 2 is illustrated in FIG. 3. The disc drive 21 includes a storage medium 24 that includes one or more discs 13 (FIG. 2). The disc drive further includes an interface unit 25 (e.g., a SCSI interface unit) that interfaces the disc drive to the remainder of the data processing system. The disc drive may optionally be provided with a cache 27 that is coupled to the storage medium 24 in a conventional fashion. The disc drive 21 may also include compression hardware 29 that can be used to compress information received from the data processing system before it is stored in the storage medium 24. In the illustrative embodiment shown in FIG. 3, the compression hardware 29 is disposed between the SCSI interface 25 and the cache 27. However, it should be understood that the compression hardware can alternatively be disposed between the cache and the storage medium 24. The use of compression techniques in accordance with the present invention to minimize reductions in capacity are described in more detail below. Finally, the disc drive includes a control processor 31 that is coupled to each of the other components and controls the operation of the disc drive.

The control of the seeking direction for the head 9 (FIG. 1) to choose between a track (e.g., TRACK_0 15) or its mirror (e.g., TRACK_0 22) is a straightforward matter that can be implemented in microcode on the control processor 31. It should be appreciated that whenever data is written to one of the tracks that has a mirror, a double write of the data can be implemented to achieve the mirroring function. This can also be performed in a straightforward fashion in microcode in the control processor 31. For example, conventional disc drives provide a capability of mapping the logical addresses provided by the data processing system to addresses identifying the physical location of the stored information on the disc. Conventional drives use such mapping techniques when a bad sector is identified, such that a logical address identifying a bad sector is re-mapped to another physical location on the drive. A similar technique can be employed to achieve the double write when implementing the embodiment of the invention shown in FIG. 2, such that the logical address identifying a track having a mirror can identify the track itself (e.g., TRACK_0 15) in a first write operation, and then be re-mapped to its corresponding mirror (e.g., TRACK_0 22) for a second write operation.

Figure 4:
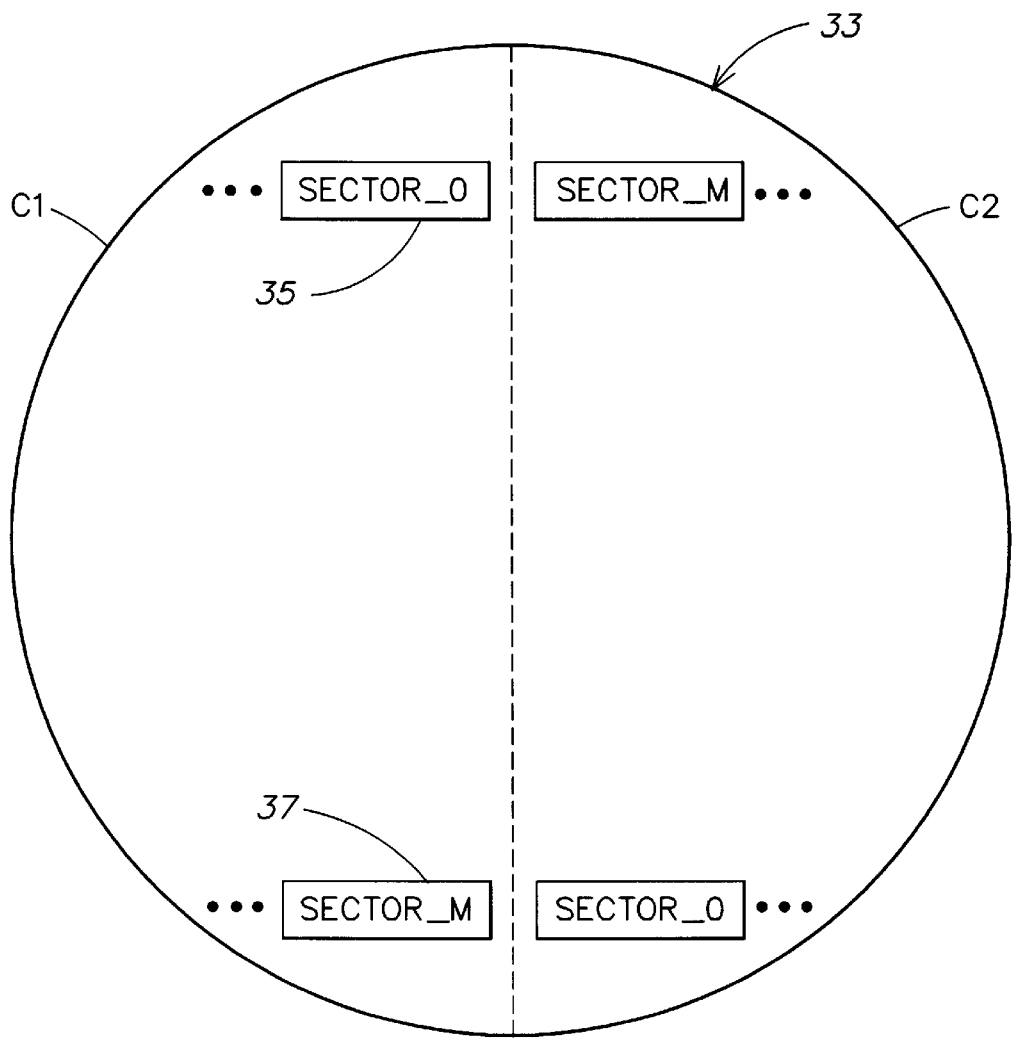
FIG. 4 illustrates one embodiment of the invention for achieving improved latency performance.

An alternate embodiment of the invention is shown in FIG. 4, which employs mirroring techniques in a different manner than the embodiment of FIG. 2 to achieve improved system performance. The embodiment of the invention shown in FIG. 4 is arranged to reduce the latency of the system by mirroring the data so that every sector is stored twice on the same track at positions that are approximately 180° apart. For example, FIG. 4 illustrates a track having a number of sectors from SECTOR_0 35 through SECTOR_M 37. These sectors are stored twice on the same track, once in a first region C1 of the disc 33, and a second time in a mirrored region C2 of the disc 33.

It should be immediately apparent that the embodiment of the invention shown in FIG. 4 reduces the latency of the system. In particular, the worst case latency involves only one-half revolution of the disc, in contrast with a conventional system wherein the latency is equal to a full disc revolution. As with the embodiment of FIG. 2, the embodiment of FIG. 4 can be implemented in a straightforward fashion in microcode in the control processor 31 (FIG. 3), and involves double writes for each sector having a mirror. The penalty incurred for performing double writes is somewhat minimized for the embodiment of FIG. 4 since the sectors are on the same track and no seek penalty is incurred.

In the embodiment of the invention shown in FIG. 4, a single mirror is provided of the data on the disc, such that the disc 33 includes a first copy of the data in region C1 and a second copy in region C2. It should be understood that the present invention is not limited in this respect, and that three or more copies can alternatively be used to decrease latency.

The feature of the present invention shown in FIG. 4 can also be used to implement a snap shot feature. In particular, some storage subsystems provide two copies of a set of data so that one copy can be frozen at a particular time to maintain a snap shot of the data as it existed at that time, while normal operations continue using the other copy of the data. Referring to the illustrative embodiment of FIG. 4, copy C2 of the disc could be used to provide a snap shot of the data at a given point in time by discontinuing further writes to that portion of the disc, while writes continue to update the other portion of the disc (i.e., C1). The portion C2 of the disc would then provide a snap shot of the data frozen at the time when writes were discontinued, and could be used on-line or could be read off of the disc to serve as a backup. Optionally, at some later point in time, the snap shot portion of the disc (e.g., C2) can be unfrozen and the data from the other portion of the disc can be copied thereto to continue operation in the manner described above.

To enable the main (C1) and mirror (C2) portions of the disc to each be written and read independently, special commands can be provided in the data processing system for accessing the disc. Alternatively, the drive can be arranged to support access to the mirrored and main portions of the disc as separate logical units. For example, in the SCSI environment, the disc drive would typically be arranged as only a single logical unit (i.e., a single "lun"). To support the snap shot feature of the present invention with a disc as arranged in FIG. 4, the disc drive can be arranged to support multiple luns, one for the main portion of the disc (C1) and one for the mirror (C2). In this manner, each portion of the disc can be accessed independently without requiring any changes to the SCSI protocol.

It should be appreciated that the embodiment of the invention described above in connection with FIG. 4 can be operated in either a normal operation mode wherein latency performance improvements are provided as discussed above, or can be operated in snap shot mode. As mentioned above, although the illustrative arrangement shown in FIG. 4 employs two copies of the data, other arrangements are possible, such that multiple mirrors can be employed. As a further alternative, smaller mirrors can be provided that do not mirror the entire capacity of the disc, and provide a snap shot capability for some subset of the data on the drive.

In another embodiment of the invention, the embodiments of FIGS. 2 and 4 are combined to reduce both the seek time and latency of the system. This results in four writes for some sectors, i.e., each sector is written twice per track to reduce latency as shown in FIG. 4, and some tracks are written twice to reduce seek time as shown in FIG. 2.

Figure 5:
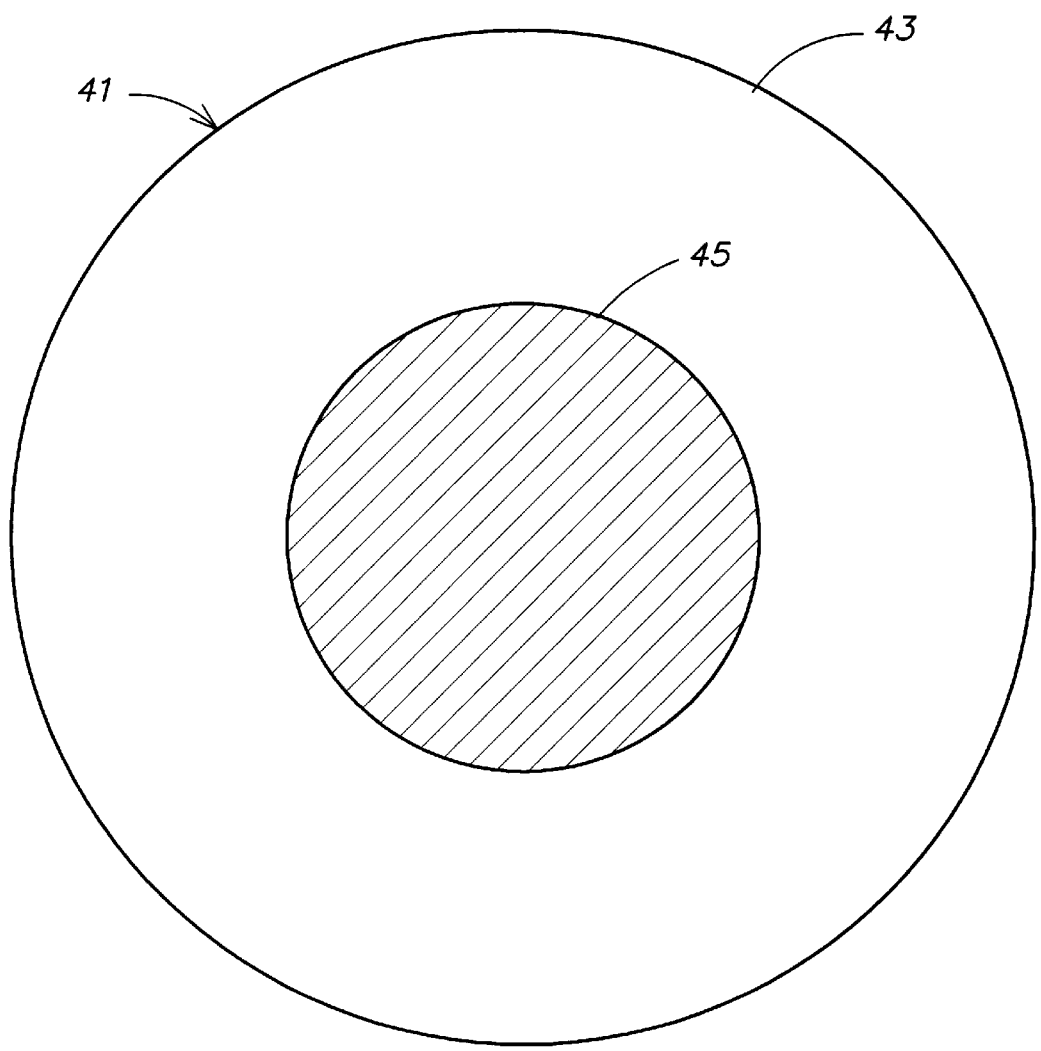
FIG. 5 illustrates the organization of a storage disc in accordance with another embodiment of the invention for achieving improved system performance.

Another illustrative embodiment of the invention is shown in FIG. 5. In this embodiment, a disc 41 is arranged so that only its outer region 43 is utilized to record information, with the inner portion of the disc 45 being unused. This implementation reduces the seek time of the system, because full strokes across the entire radius of the disc are not required. Rather, the worst case is a stroke across only the region 43 on which information is stored. In addition, the other above-discussed performance advantages when accessing outer tracks on the disc (i.e., a higher data rate and fewer track seeks) are achieved, with system performance not being degraded by accessing tracks on the inner radii of the disc.

The embodiment of the invention shown in FIG. 5 sacrifices some disc capacity due to the non-use of the area 45 on the disc. The relative sizes of the area 43 on which information is stored and the unused area 45 can be selected to strike a balance between disc capacity and system performance. For example, the area 43 on which information is stored can include the outer half of the disc. It should be appreciated that leaving the inner half of the disc as the unused area 45 reduces the capacity of the disc 41 by less than half, because as discussed above, more information is stored per track at the outer radii. It should be understood that the embodiment of the invention illustrated in FIG. 5 can be implemented in a straightforward fashion in microcode in the control processor 31 (FIG. 3).

In another embodiment of the invention, the advantages of the FIG. 5 embodiment relating to priority being given to storing data on the outer portions of the disc to increase performance are combined with compression techniques to eliminate reductions in storage capacities. Thus, information is arranged on the disc in a manner that increases system performance, without any loss of disc capacity.

Although compression techniques have been employed in the past in connection with storage devices in general and disc drives in particular, the focus of the compression techniques has consistently been to maximize storage capacity, without any regard to the performance of the system. In conventional systems, compression is generally performed at the operating system level of the data processing system, such that compressed data is provided to the disc drive 21 (FIG. 3) via the SCSI interface 25. A problem experienced in conventional disc drives that use compression is that the ratio of compression cannot be guaranteed because it is dependent on the amount of redundancy in the data. Thus, the drive cannot be guaranteed to operate as an X gigabyte drive (wherein X equals the number of physical bytes on the disc times the maximum compression ratio) because if any data does not compress to the maximum compression ratio, the drive will not be able to store X gigabytes. Thus, the actual storage capacity of the disc cannot be determined. As a result, users may be faced with errors that occur when the disc becomes full in an unpredictable fashion.

The unpredictability of the storage capacity of discs using conventional compression techniques is further aggravated by the fact that these techniques typically attempt to compress each piece of information by as high a compression ratio as possible, such that some information may be compressed at the maximum achievable compression ratio, while other pieces of information are compressed by smaller ratios when that is all that the redundancy in the data allows. Thus, when information is compressed, it will take some percentage of the space on the disc that it would have occupied if not compressed, but the percentage is data dependent and cannot be predetermined.

Figure 6:
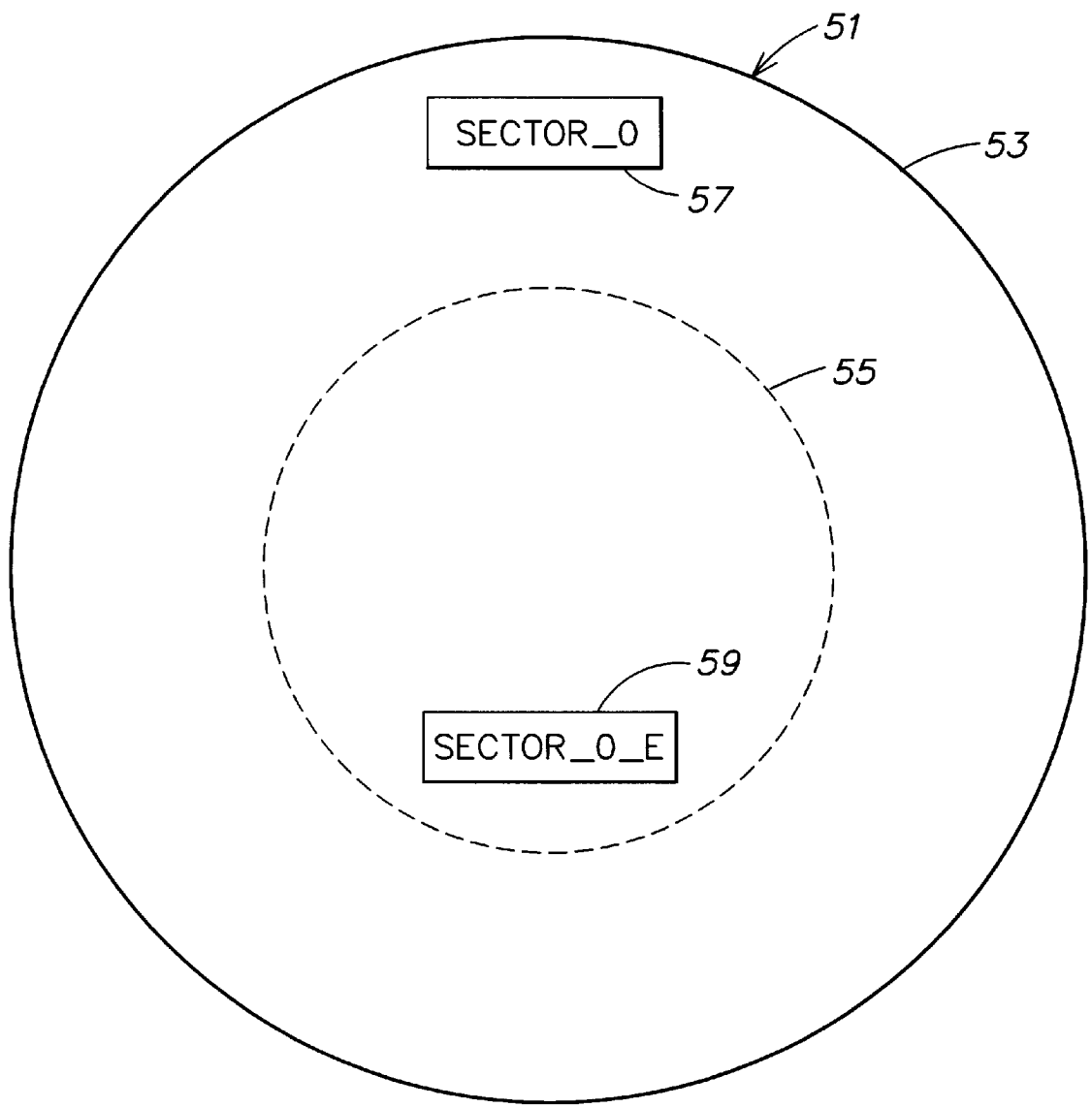
FIG. 6 illustrates an arrangement of a storage disc in accordance with another illustrative embodiment of the invention employing compression techniques to achieve improved system performance.

FIG. 6 illustrates an embodiment of the present invention that configures a disc 51 to preferably store information on its outer radii to achieve the performance improvements discussed above, while also employing compression techniques to ensure no loss in disc capacity. In the illustrative example shown in FIG. 6 and described below, a compression ratio of 2:1 is employed. However, the invention is not limited in this respect, and it should be understood that other compression ratios can also be employed in accordance with the present invention.

The embodiment of the invention disclosed in FIG. 6 is similar in some respects to that described above in connection with FIG. 5, in that preference is given to storing information on an outer sector 53 of disc 51. However, unlike the embodiment of FIG. 5, compression techniques are employed in association with the embodiment of FIG. 6 so that the storage capacity of disc 51 is not reduced. For example, when a compression ratio of 2:1 is employed, the outer region 53 includes one-half the storage capacity of the disc. It should be appreciated that the outer region 53 will be thinner than the inner region 55 (i.e., the outer region 53 will include fewer tracks) because, as discussed above, the larger radii for the outer tracks results in more information being stored per track.

If the compression ratio of 2:1 could be guaranteed, all of the data could be stored on the outer portion of the disc, which would result in a number of performance advantages over a conventional storage disc of the same capacity. The seek time of the system would be reduced by more than half as the head 9 (FIG. 1) would need to move across less than half the disc radius to read all of the tracks in the outer zone 53. In addition, the data rate of the system would be doubled, because each compressed sector includes twice as much information when compared with a sector of non-compressed data. The latency of the system would be unchanged, and would equal that of a conventional disc configuration.

As discussed above, compression is data dependent and even a ratio of 2:1 can generally not be guaranteed. Therefore, in the embodiment of the invention shown in FIG. 6, a technique is employed to handle those sectors that do not achieve the specified compression ratio. Initially, the disc drive is configured to reduce the standard sector size (e.g., 512 bits for a SCSI system) by dividing it by the compression ratio. For example, for a SCSI system having a compression ratio of 2:1, the disc would be formatted to include sector sizes of 256 bytes. This formatting can be achieved in a straightforward manner in the microcode of control processor 31. In addition, each reduced-size sector in the outer region 53 of the disc is provided with a corresponding extended sector in the inner region 55 of the disc. For example, as shown in FIG. 6, SECTOR_0 57 is provided with a corresponding extended sector 59 labeled as SECTOR_0_E.

Each standard size block of data (e.g., 512 bytes) sent to the disc drive 21 (FIG. 3) is either capable of being compressed in accordance with the compression ratio (e.g., 2:1) or it is not. For each block that compresses in accordance with the compression ratio, the information is stored entirely within the sector of reduced size in the outer region of the disc (e.g., sector 57). Each block of data that does not compress in accordance with the compression ratio is not compressed at all. Half of the uncompressed block is stored in the appropriate sector in the outer region of the disc (e.g., SECTOR_0 57), and the other half is stored in the extended sector that corresponds thereto (e.g., SECTOR_0_E 59). It should be appreciated that since there is an extended sector assigned to each of the sectors in the outer region 53 of the disc, there is sufficient storage capacity to handle the worst case scenario where none of the data passed to the drive compresses. Therefore, unlike compression techniques used in conventional systems to maximize storage capacity, the maximum storage capacity of a disc drive according to the embodiment of the present invention shown in FIG. 6 can be guaranteed. Thus, the maximum storage capacity of the disc can be selected to meet the maximum storage needs of the system.

The performance improvements achieved by employing the embodiment of the invention shown in FIG. 6 should be readily apparent. For those blocks of data that satisfy the compression ratio and are therefore stored only in the outer region 53 of the disc, the seek time of the system is reduced because the head 9 (FIG. 1) need only travel over a portion of the radius of the disc to fully traverse the outer region 53. In addition, for each of the compressed blocks, the data rate of the system is doubled as discussed above.

It should be appreciated that for those blocks of information that do not satisfy the compression ratio, multiple reads and writes are employed to implement the embodiment of the invention shown in FIG. 6. As shown in FIG. 6, each sector and its corresponding extended sector (e.g., sectors 57 and 59) can be offset from one another along the rotational path of the disc. In this respect, the latency of the system is reduced when doing the multiple read/write operations to a sector and its extension. The amount of offset can be determined based upon the rate of rotation of the disc and the seek time to travel from the track on which the sector is located to the track of its extension. In this manner, the delay in performing the double read/write is attributable only to the seek time, without any additional latency delay.

In one embodiment of the invention, the compression/decompression of the data is performed within the disc drive 21. The compression/decompression can be performed by microcode in the control processor 31, or alternatively can be performed using dedicated compression hardware 29 arranged between the SCSI interface 25 and the cache 27 as shown in FIG. 3. Dedicated compression chips well-known for use in tape drive storage systems can be employed to implement the compression hardware 29. Examples of such chips include those in a family of compression coprocessors from Hi/fn, 5973 Avenida Encinas, suite 110, Carlsbad, Calif. 92008.

Performing compression/decompression using dedicated hardware within the disc drive 21 is advantageous because the compression/decompression is transparent to the data processing system, which need not be modified in any respect to employ the features of the present invention shown in FIG. 6. In addition, conventional compression hardware in use in the tape drive field is capable of operating sufficiently fast so as to not reduce the performance of the disc drive 21. For example, many compression chips in the tape drive field can run at a rate of forty megabytes per second, wherein disc drives conventionally run at a rate of approximately fifteen megabytes per second. In addition, it should be appreciated that the disc drive 21 can be pipelined in a conventional fashion, such that once the pipe is full, the process of compressing/decompressing the data does not diminish system performance.

Although performing the compression/decompression within the disc drive 21 provides the advantages described above, it should be appreciated that the invention is not limited in this respect, and that the embodiment of the invention illustrated in FIG. 6 can alternatively be implemented by controlling the compression/decompression at the operating system level of the data processing system. The operating system of the data processing system can include a map to control where information is written to and read from the disc. Thus, the data processing system can implement the embodiment of the present invention shown in FIG. 6 by doing compression/decompression outside of the disc drive, and by performing multiple read or write operations for data that cannot be compressed by the compression ratio.

A simple technique can be employed to identify and manage those sectors in the outer region 53 of the disc which have not been compressed, and therefore, have data stored in their corresponding extended sectors. In particular, in one embodiment of the invention, information is stored in each sector in the outer region 53 indicating whether the data stored therein is compressed. Thus, when a sector in the outer region 53 of the disc (e.g., sector 57) is read, the information stored therein can be checked to determine whether additional information is stored in the corresponding extended sector (e.g., sector 59). This information can be stored, for example, as a single bit.

The implementation of a management scheme to control reading and writing of the sectors in the outer region 53 of the disc and their corresponding extended sectors can be implemented in a straightforward fashion in microcode in the control processor 31. As mentioned above, conventional disc drive systems include the capability of mapping a particular logical address to a different physical address when a bad block is encountered. Similar mapping techniques can be employed such that a map can be provided that identifies the address of the extended sector corresponding to each sector in the outer region 53 of the disc. However, in one embodiment of the invention, a simpler technique is employed. In particular, an algorithm can be employed that directly maps from the address of each sector to its corresponding extended sector. In this fashion, a mapping table need not be employed, as the control processor 31 can use the algorithm to automatically determine the address for the corresponding extended sector directly from the sector address.

In the embodiment of the invention shown in FIG. 6, the extended sectors are formed on the same disc surface as the sectors to which they correspond. However, it should be understood that the invention is not limited in this respect, and that the extended sectors can alternatively be formed on another disc surface within the disc drive 21 (FIG. 3). As discussed above, a disc drive typically includes a plurality of discs (some including two recording surfaces) that can be stacked in a cylindrical arrangement. In this arrangement, tracks that overlie one another together form a set that is referred to as a cylinder. Performing a seek operation between tracks within a cylinder (i.e., between tracks on different disc surfaces) can be accomplished very quickly. Therefore, in an alternate embodiment of the invention, a disc surface is dedicated to providing extended sectors for those on a primary disc surface, with the extended sectors being within the same cylinder as the sectors to which they correspond.

In an alternate embodiment of the invention, a number of extended sectors can be provided for each main sector, so that the extended sectors can store an entire block of uncompressed data. For example, referring to the example above wherein the compression ratio is 2:1, two extended sectors can be provided for each main sector. When a block of data compresses, it is stored entirely in the main sector. Alternatively, when a block of data does not compress, it is stored entirely in the corresponding pair of extended sectors. This embodiment of the invention results in a reduction of capacity in comparison to the embodiment of FIG. 6. However, performance improvements are achieved when accessing uncompressed blocks of data, because uncompressed blocks are stored in consecutive sectors on the disc so that no seek delays are incurred when doing a read/write of an uncompressed block of data.

The embodiment of the invention disclosed in FIG. 6 is advantageous in its assignment of a dedicated extended sector to handle blocks that cannot compress into a single reduced sized sector, because the management of the extended blocks is very simple. However, it should be appreciated that the present invention is not limited to this implementation, and that allocation of the compressed and uncompressed blocks on the disc can be implemented in different ways. For example, all blocks of information written to the disc can be stored in contiguous locations on the disc. For this embodiment, each sector of the disc can still be subdivided into multiple smaller sectors based upon the compression ratio employed. Thus, in the illustrative example described above wherein the compression ratio is 2:1, each sector can be subdivided into two smaller sectors. Each block of information that is capable of being compressed is written to the disc in a single smaller sector. Alternatively, those blocks that cannot be compressed are written to the disc in an uncompressed manner, and are stored in two contiguous sectors on the same track. This embodiment of the invention is shown conceptually in FIGS. 7(a)–(b).

Figure 7A:
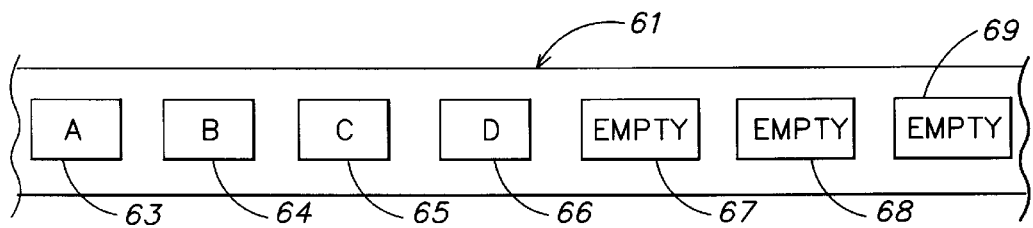
FIGS. 7(a)–(b) illustrate the arrangement of compressed blocks of data on a track in a storage disc in accordance with one illustrative embodiment of the invention.
Figure 7B:
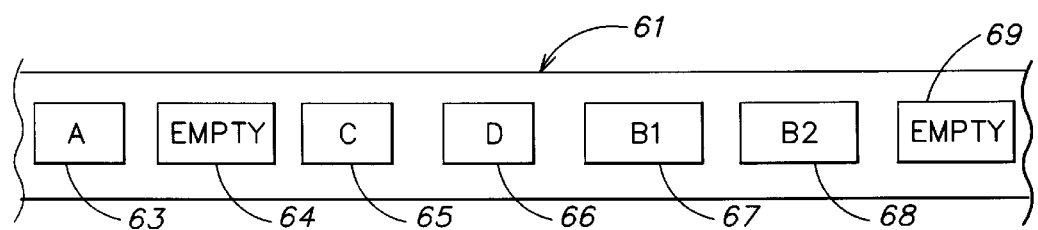

FIGS. 7(a)–(b) show a portion of a track 61 that includes a plurality of sectors 63–69, with the sectors having a size determined based upon the compression ratio of the system. In FIG. 7(a), sectors 63–66 store compressed blocks of data respectively labeled A–D, and sectors 67–69 are empty. It should be appreciated that when a block of data on the disc is modified, it may be modified from a set of data that is capable of compression to one that is not. When a block of data that was previously compressed is modified and is no longer capable of compression, the block must be moved when the embodiment of the invention shown in FIGS. 7(a)–(b) is employed. This is illustrated in the figures with block B, which is stored in sector 64 when in the compressed state shown in FIG. 7(a). However, when the block B is modified, it is moved to two previously empty sectors 67 and 68, with one-half of the block (i.e., B1 and B2) being stored in each of those sectors. The sector 64 that previously stored the compressed block B is then empty.

The embodiment of the invention shown in FIGS. 7(a)–(b) is advantageous in that no seek delay is incurred when performing multiple reads or writes on blocks that do not compress. However, when this embodiment of the invention is employed, the management scheme (which can be implemented in microcode in processor 31) should employ some technique for indicating which sectors on the disc are empty. This can be implemented in a conventional manner using a mapping scheme. In addition, it should be appreciated that the embodiment disclosed in FIGS. 7(a)–(b) may result in data being stored on the disc in a sequence that is different from that in which it was written. For sequential input/output systems, the fastest system performance occurs when the disc accesses data that is sequentially stored on the disc. Thus, it is advantageous to have data stored in sequential order, as is the case with the compressed blocks in the embodiment of FIG. 6. In addition, the implementation shown in FIGS. 7(a)–(b) may also result in some empty sectors (e.g., sector 64 in FIG. 7(b)) being dispersed throughout the disc. Thus, when this embodiment of the invention is employed, the management routine may also preferably include a defragmentation routine that periodically reorders the data stored on the disc to remove empty sectors dispersed throughout the disc. The defragmentation routine can be implemented by the drive itself or by the data processing system.

As discussed above, the present invention is not limited to the use of a 2:1 compression ratio, which was described above merely for illustrative purposes. Other compression ratios can also be employed. When used in conjunction with the embodiment of the invention described in connection with FIG. 6 wherein dedicated extended sectors are assigned to each sector in the outer region 53 of the disc, the number of extended sectors depends upon the compression ratio. For example, if a compression of 4:1 is employed, the standard block size (e.g., 512 bytes) would be divided by four (e.g., 128 bytes) to create reduced size sectors on the disc in the manner discussed above. To handle the worst case situation wherein no compression can be performed, three extended sectors would be assigned to each of the primary sectors located on the outer region 53 of the disc.

It should be appreciated that since compression techniques are employed in accordance with some embodiments of the present invention to increase system performance rather than storage capacity, the focus is not necessarily to compress each block of data to the highest compression ratio possible. Rather, system performance is maximized by ensuring a high success rate in terms of the percentage of blocks that can be compressed using the chosen compression ratio, so that the number of multiple reads/writes to extended blocks is minimized. Furthermore, compression techniques may be employed with the present invention that are too inefficient for systems that desire to maximize capacity, particularly if compression can be done relatively quickly using such techniques.

It should be understood that the improved performance achievable through the use of the embodiments of the present invention may enable a desired level of performance to be achieved using less expensive technology than would be required using conventional systems. For example, a typical 5,400 rpm drive would have a seek rate of 28 ms, an average latency of 5.55 ms and a data rate of 7–10 MB/sec. A typical 10,033 rpm drive would have a seek rate of 19 ms, an average latency of approximately 2.99 ms and a data rate of approximately 10–15 MB/sec. Using the embodiment of the invention shown in FIG. 6 and assuming a 100% success rate in block compression, the seek rate of the system is cut at least in half, and the data rate is doubled, which would enable a 5,400 rpm drive to approximate the performance of a 10,033 rpm drive.

In another illustrative embodiment of the invention, special commands are provided to make use of compressed data on a disc drive to speed the performance of a number of applications. These commands are described below as being used in association with the embodiment of the invention shown in FIG. 6. However, this embodiment of the invention is not limited in this respect. These commands can be used in association with any disc drive on which data is stored in a compressed state.

When compression/decompression is performed within the disc drive 21 (FIG. 3), these operations are transparent to the remainder of the data processing system, such that writes to and reads from the drive generally deal with uncompressed data. The arrangement of the data (which may include both compressed and uncompressed data as described above in connection with FIG. 6) on the disc is managed within the drive in the manner described above. One embodiment of the invention involves the implementation of several new commands that the data processing system can employ in association with the disc drive 21. A first such command is labeled a raw write and is employed when compressed data is written to the disc. The execution of the raw write command specifies to the disc drive that the data is already in compressed form. Thus, the disc drive simply writes the data onto the disc in its raw form, without attempting to further compress the data, and without managing the data as if it were uncompressed. The raw write command is used to write compressed data to the main sectors, and is not used to write data to the extended sectors.

The second command is labeled a raw read and expects that the data read in response thereto is in compressed form, such that if executed on uncompressed data, the disc drive will return an error. Thus, the raw read command is used to read compressed data from the main sectors, and is not used to read data from the extended sectors. Compressed data read in response to the raw read command is passed to the data processing system in its raw form, without being uncompressed by the disc drive. It should be appreciated that depending upon the redundancy in the data, some compressed blocks will compress at a rate higher than the compression rate for the system (e.g., 2:1 in the illustrative example). Thus, when a raw read is performed, some technique should preferably be provided to indicate which of the bytes read include compressed data, and which bytes are merely filler bits used to fill the full block size allocated to the compressed data. In one embodiment of the invention, each compressed block of data includes information stored therein (e.g., a byte of data) that identifies the number of bytes within the compressed block that includes compressed data. One advantageous feature of this embodiment is that when the data is copied for any of the numerous applications discussed below, only the bytes that actually include useful information need be moved, such that performance improvements are achieved by not moving any filler bits. In an alternate embodiment of the invention, no information is stored within the compressed block of data itself to identify its length. Rather, when the data is decompressed during the read operation, the output is monitored to determine the number of decompressed bytes of data generated thereby.

When the number of bytes matches the uncompressed block size, the system recognizes that any remaining information generated for that block is filler. This implementation has the advantage of ensuring that no additional data need be stored to identify the amount of compressed data.

Finally, a query command can be employed that passes a starting block and range to the disc drive querying which sectors in the specified range store compressed data, and which store uncompressed data. This command can be employed by the data processing system to determine which sectors should be read using the raw read command and which sectors do not include compressed data and should be read using the normal read command.

In an alternate embodiment of the invention, new commands for the raw read and raw write need not be implemented for the data processing system. Rather, the disc drive can be arranged to support multiple luns, one for reading the outer region 53 of the disc, one for reading the inner region 55, and another that performs a normal read operation. The luns for reading the inner and outer regions of the disc would read the data from the disc in its raw form, without decompressing the data. The lun that performs the normal read operation would read both the main and extended sectors when the block is not compressed, and would read and decompress the main sector when the block of data is compressed. The query command can be employed to determine which sectors include compressed data and which do not. Those sectors in the outer region 53 that include compressed data can be read using the lun for reading that region of the disc, and their corresponding extended sectors need not be read. For those sectors in the outer region 53 that do not include compressed data, the lun that performs the normal read operation can be employed to read both the main sector and its corresponding extended sector. Alternatively, the outer sector can be read using the lun for reading the outer region 53 of the disc, and the corresponding extended sector can be read using the lun for reading the inner region 55.

It should be appreciated that when data is written to or read from the disc in raw form, the effective rate of data transferred to and from the disc drive is increased. For example, using the exemplary 2:1 compression ratio discussed above, a read of a compressed block stored in a reduced-size sector of 256 bytes actually represents 512 bytes of data. Thus, by operating upon the raw data, the performance of a number of applications can be improved. Although a number of specific examples are discussed below, it should be understood that the invention is not limited to these particular applications, and that the embodiment of the invention that operates upon raw data can also be used to increase the performance of other applications. In addition, the specific commands described above are provided merely for illustrative purposes, and it should be understood that other commands can also be employed to operate upon raw data to increase the performance of specific applications.

A first illustrative application whose performance can be improved by operating upon raw data is a backup of the disc drive, which can include either a partial backup or a full backup of the entire drive. Using the illustrative commands discussed above, the data processing system first queries the disc drive to determine which of the sectors in the range to be backed up include compressed data and which include uncompressed data. The drive is then read using normal reads for the uncompressed data and raw reads for the compressed data. The backup operation is performed more quickly than in a conventional disc drive system, because fewer bytes need to be moved from the drive to the backup media than if the compressed data were first decompressed and then moved to the backup media. For example, assuming the illustrative 2:1 compression ratio discussed above and 100% compressibility of the blocks, the backup operation would take approximately one-half the time it would take in a conventional system that operates upon uncompressed data.

In another embodiment of the invention, an alternate command can be employed when the entire disc is to be backed up. This command operates in a manner similar to the raw read command in its handling of compressed data, but is also capable of reading uncompressed data without an error. In particular, the new command (labeled "sequential raw read") sequentially reads all blocks on the disc. All data on the disc is transferred to the data processing system in its raw form. In addition, when used in conjunction with an embodiment of the invention such as that shown in FIG. 6 wherein uncompressed data is stored partially in one or more extended sectors that are not contiguous with the main sector (e.g., sector 57 in FIG. 6), only the main sector is read initially, with the extended sectors being accessed later when their tracks are read. In this manner, each track of the disc is simply read in its raw form. This further increases system performance because no significant seek time is incurred seeking from a main sector to its extended sectors.

A second application that can make use of the transfer of data in its uncompressed state is the rebuilding of a disc in a RAID system wherein two discs are employed that contain identical copies of data for fault tolerant reasons. If a single disc fails, a replacement disc is chosen and the data is copied to it from the surviving good disc in a process typically called re-silvering or rebuilding. The transfer of data from the good disc to the new disc can be sped up by transferring compressed data in its raw state, in much the same manner as the back up application discussed above. The raw read or sequential raw read commands discussed above can be used to perform the re-silvering operation.

Another application that benefits from the use of transferring raw compressed data is a feature of some disc drive systems referred to as business continuance volume (BCV), wherein a copy of a disc is kept and updated in real-time. The system has the capability of splitting the copying disc from the updating feature to create a snap shot of the data at a particular point in time. The snap shot copy can then be used to perform various operations, such as a backup or report generation. When such operations have completed, the BCV is reconnected to the updating feature and is updated with all changes that occurred while it was disconnected. During the initial set up of the BCV, the features of the present invention relating to the transfer of raw compressed data can be used to create the disc copy. These features of the present invention can also be used to incrementally update the BCV when it is reconnected to the updating feature.

Another application in which the transferal of raw compressed data can be beneficial is in a remote data facility (RDF) where a mirroring disc drive is provided at a remote location. The mirroring drive and the main drive are typically connected via a network having a bandwidth that is less than that of the disc drives, such that the network is a limiting factor in the effective bandwidth of the system. In accordance with the principals of the present invention, when data is written to the disc drive in compressed form, it is then read using a raw read and is transferred over the network to the mirroring drive. In this manner, fewer bytes are sent over the network between the disc drives, thereby increasing the effective bandwidth of the system. When the data is not compressed, it need not be re-read from the drive 21 (FIG. 3), but can simply be sent from the cache 27 over the network to the mirroring device.

In addition to increasing the effective bandwidth of the network in an RDF system, the transferring of raw data can also be advantageous in an RDF system for reasons similar to those discussed above in connection with a RAID system. For example, the mirroring drive can be in a rebuilding state similar to that discussed above in connection with a RAID system if the mirroring device fails and is replaced. In addition, if the network between the drives goes down for any reason and then the link is reconnected, the mirroring device can be re-silvered in much the same manner as discussed above in connection with the BCV to bring the mirror up to date with any updates to the main drive. Thus, for each of these operations in an RDF, the processing of raw compressed data provides advantages similar to those described above.

Figure 8:
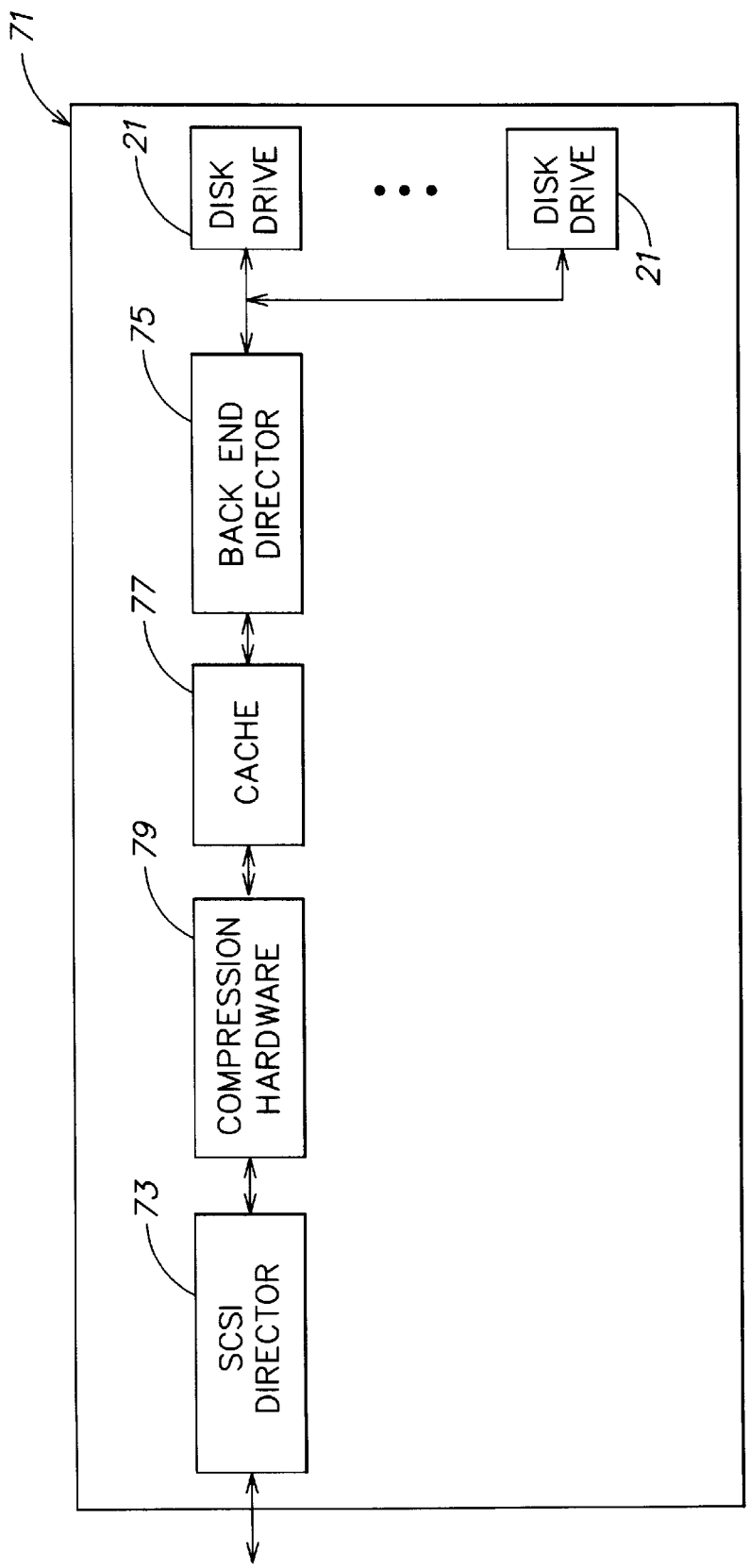
FIG. 8 is a block diagram of a storage system in accordance with one illustrative embodiment including a plurality of disc drives and compression hardware for use therewith.

Another embodiment of the invention illustrated in FIG. 8 is directed to a storage subsystem 71 that includes a plurality of disc drives 21. An example of such a storage subsystem is the SYMMETRIX line of disc arrays, available from EMC Corporation, Hopkinton, Mass. The storage subsystem 71 includes a SCSI director 73 that controls the interface for communicating with the data processing system, a back end director 75 that controls communication with the plurality of disc drives 21, and a cache 77 disposed therebetween. In accordance with one illustrative embodiment of the invention, compression hardware 79 (which can be implemented using any of the standard compression chips discussed above in connection with the compression hardware 29 of FIG. 3) is disposed between the SCSI director 73 and the cache 77.

In one embodiment of the invention, the compression hardware 79 does not compress data written into the storage subsystem 71, such that the compression of data is performed by the compression hardware 29 (FIG. 3) within the disc drives 21. However, the compression hardware 79 decompresses data read from the disc drives, such that the disc drives perform only a raw read operation, with the compression hardware 29 not performing any decompression operations. As a result, data moving through the back end of the storage subsystem 71 has a higher bandwidth. In particular, since the compressed data is stored in fewer bytes, fewer instructions need be executed to transfer the compressed data from the disc drives 21 into the cache 77, and to transfer data from the cache 77 to the data processing system.

In another embodiment of the invention, the compression hardware 79 compresses the data written to the storage subsystem 71, as well as decompressing it, such that the disc drives 21 need not include the compression hardware 29 shown in FIG. 3. In this embodiment of the invention, bandwidth improvements are also achieved when transferring data into the cache 77 and into the disc drives 21 during a write operation.

It should be understood that when the compression hardware 79 is included in the storage subsystem 71 of FIG. 8, it operates upon the data in much the same fashion as discussed above in connection with the compression performed within the disc drives 21. For example, if a block of data is not capable of compression, it can be stored in a main block of data as well as one or more extended blocks corresponding thereto.

It should further be understood that although the embodiment of the invention shown in FIG. 8 provides the advantages discussed above, the aspect of the invention directed to a storage subsystem that includes a plurality of disc drives is not limited in this respect. In particular, the present invention also contemplates the use of a storage subsystem 71 that includes a plurality of disc drives 21 each arranged in accordance with any of the other embodiments of the invention discussed above, without any compression hardware 79 being provided within the storage subsystem 71.

Figure 1:
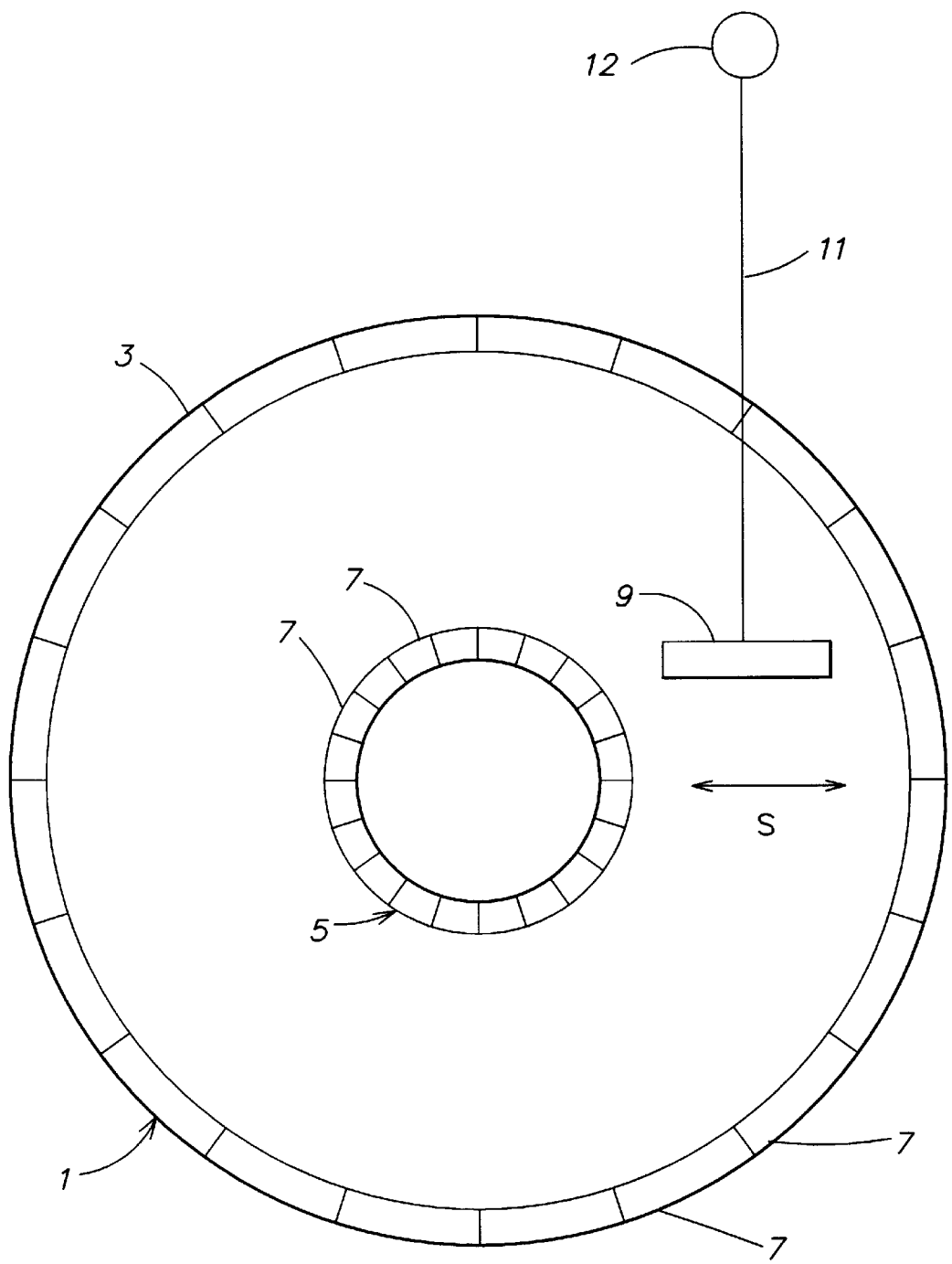
FIG. 1 conceptually illustrates a storage disc and a head for accessing data thereon.

The illustrative disc drive system of FIG. 1 includes a single head 9 for accessing information on the entire surface of the disc 1. Although the embodiments of the invention discussed above can be employed with a disc drive that includes a single head for each disc surface, the present invention is not limited in this respect. In particular, alternate embodiments of the present invention employ multiple heads to access a single disc surface. The use of multiple heads can reduce the seek time of the system by dedicating each of the heads to a particular group of tracks. For example, a first head can be dedicated to a set of inner tracks while a second head is dedicated to a set of outer tracks. Alternatively, multiple heads can also improve the latency of the system by positioning the heads above the same track and offsetting the heads by a certain number of degrees about the circumerence of the track.

One illustrative example employing multiple heads can be implemented in connection with the embodiment of FIG. 6. One head can be provided to access the outer region 53 of the disc, and a second head can be provided to access the inner region 55. This avoids seek delays when performing a double read/write to a main sector (e.g., 57) and its corresponding extended sector (e.g., 59). Similarly, in the embodiment of FIG. 4, two heads can be provided 180 degrees apart to avoid latency delays in performing a double write to both portions of the disc C1 and C2. Alternatively, the two heads can be provided approximtely 90 degrees apart to further reduce the worst case latency of the system. It should be appreciated that numerous other arrangements including two or more heads can be employed to achieve improved system performance in conjunction with each of the above-described embodiments of the present invention.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A disc drive having a maximum storage capacity that defines a maximum number of bytes of information passed to the disc drive that can be stored within the disc drive, the disc drive comprising:

a storage medium including at least one disc, the storage medium having a maximum storage capacity of C bytes for information that is uncompressed;

compression means for compressing information to be written to the storage medium at a minimum compression ratio equal to at least 2:1; and a controller that controls the writing of information to the storage medium so that the maximum storage capacity of the disc drive is limited to C bytes.

2. The disc drive of claim 1, wherein the disc drive is adapted to receive blocks of information having an uncompressed block size when in an uncompressed state, wherein the at least one disc has a plurality of sectors that each is adapted to store a block of information when in a compressed state, and wherein each of the plurality of sectors has a size that is substantially equal to the uncompressed block size divided by the minimum compression ratio.

3. The disc drive of claim 2, wherein the minimum compression ratio is equal to X:1, and wherein each of the plurality of sectors is part of a sector set that includes X sectors, so that each of the plurality of sector sets is capable of storing one of the blocks of information in the uncompressed state.

4. A method of managing information to be stored on at least one disc in a disc drive system, the at least one disc including a plurality of sectors that are arranged to form a plurality of tracks, the method comprising steps of:

(A) forming a plurality of sector sets from the plurality of sectors, each sector set including a main sector and at least one corresponding extended sector;

(B) when a block of information to be written to the disc drive is compressed by a sufficient amount that the block of information can be stored within one of the main sectors, storing the block of information in a compressed state in one of the main sectors and identifying the at least one extended sector corresponding to the one of the main sectors as being in an empty state; and (C) when a block of information to be written to the disc drive cannot be compressed by a sufficient amount to be stored within one of the main sectors, storing the block of information in an uncompressed state partially in one of the main sectors and partially in the at least one extended sector that corresponds to the one of the main sectors.

5. The method of claim 4, wherein the at least one disc includes a plurality of discs that each includes at least one surface on which information can be stored, and wherein step (A) includes a step of forming the plurality of sector sets so that the main sector for each sector set is stored on a different disc surface than its corresponding at least one extended sector.

6. The method of claim 4, wherein step (A) further includes a step of forming the plurality of sector sets so that:

each of the main sectors and its at least one extended sector is formed on a common surface of the at least one disc;

each of the main sectors is formed on an outer region of the common surface, the outer region including a first group of the plurality of tracks; and each of the at least one extended sectors is formed on an inner region of the common surface, the inner region including a second group of the plurality of tracks.

7. The method of claim 6, wherein step (A) includes a step of forming the plurality of sector sets so that the main sector and the at least one extended sector for each of the plurality of sector sets are rotationally offset such that a line passing through a center of the disc and the main sector does not pass through the at least one extended sector.

8. The method of claim 6, wherein:

step (B) includes a step of writing information to the one of the main sectors indicating that the one of the main sectors stores a block of information in the compressed state; and step (C) includes a step of writing information to the one of the main sectors indicating that the one of the main sectors stores a portion of a block of information in the uncompressed state.

9. The method of claim 8, wherein step (A) includes a step of forming each of the plurality of sector sets so that a location on the at least one disc for the at least one extended sector is predetermined by a location on the disc of its corresponding main sector.

10. The method of claim 4, wherein step (A) includes a step of forming the plurality of sector sets so that the main sector and the at least one extended sector for each of the plurality of sector sets are rotationally offset such that a line passing through a center of the disc and the main sector does not pass through the at least one extended sector.

11. The method of claim 10, wherein the disc drive system includes a head that accesses information on the at least one disc, and wherein step (A) includes a step of forming the plurality of sector sets so that the main sector and the at least one extended sector for each of the plurality of sector sets are rotationally offset by an amount that is dependent upon a rate of disk rotation and head seek for the disk drive system, such that a time period for rotation of the at least one disc to move from a first rotational position wherein the main sector is in line with the head to a second rotational position wherein the at least one extended sector is in line with the head is substantially equal to a time period for the head to complete a seek from the main sector to the at least one extended sector.

12. The method of claim 4, wherein:

step (B) includes a step of writing information to the one of the main sectors indicating that the one of the main sectors stores a block of information in the compressed state; and step (C) includes a step of writing information to the one of the main sectors indicating that the one of the main sectors stores a portion of a block of information in the uncompressed state.

13. The method of claim 12, wherein step (A) includes a step of forming each of the plurality of sector sets so that a location on the at least one disc for the at least one extended sector is predetermined by a location on the disc of its corresponding main sector.

14. The method of claim 4, wherein step (A) includes a step of forming each of the plurality of sector sets so that a location on the at least one disc for the at least one extended sector is predetermined by a location on the disc of its corresponding main sector.

15. The method of claim 4, wherein the disc drive system operates upon blocks of information having an uncompressed block size when in the uncompressed state, and a compressed block size when in the compressed state that is determined by a minimum compression ratio, and wherein step (A) includes a step of forming the plurality of sector sets so that each of the main and extended sectors has a size that is substantially equal to the uncompressed block size divided by the minimum compression ratio.

16. The method of claim 15, wherein the minimum compression ratio is equal to X:1, and wherein step (A) includes a step of forming each of the plurality of sector sets to include a number of sectors equal to X.

17. The method of claim 4, further including a step of, for each of the extended sectors that corresponds to a main sector that stores a block of information in the compressed state, maintaining the extended sector in the empty state when additional blocks of information are subsequently written to the at least one disc.

18. A disc drive, comprising:

at least one disc including a plurality of sectors that are arranged to form a plurality of tracks; and a controller that manages writing of blocks of information to the at least one disc, the controller being adapted to arrange the plurality of sectors in a plurality of sector sets, each sector set including a main sector and at least one corresponding extended sector, the controller being further adapted to manage the writing of blocks of information to the at least one disc so that;

when a block of information to be written to the disc is compressed by a sufficient amount that the block of information can be stored within one of the main sectors, the controller stores the block of information in a compressed state in one of the main sectors and identifies the at least one extended sector corresponding to the one of the main sectors as being in an empty state; and when a block of information to be written to the disc cannot be compressed by a sufficient amount to be stored within one of the main sectors, the controller stores the block of information in an uncompressed state partially in one of the main sectors and partially in the at least one extended sector that corresponds to the one of the main sectors.

19. The disc drive of claim 18, wherein the at least one disc includes a plurality of discs that each includes at least one surface on which information can be stored, and wherein the controller includes means for arranging the plurality of sector sets so that the main sector for each sector set is stored on a different disc surface than its corresponding at least one extended sector.

20. The disc drive of claim 18, wherein the controller includes means for arranging the plurality of sector sets so that:

each of the main sectors and its at least one extended sector is formed on a common surface of the at least one disc;

each of the main sectors is formed on an outer region of the common surface, the outer region including a first group of the plurality of tracks; and each of the at least one extended sectors is formed on an inner region of the common surface, the inner region including a second group of the plurality of tracks.

21. The disc drive of claim 18, wherein the controller includes means for arranging the plurality of sector sets so that the main sector and the at least one extended sector for each of the plurality of sector sets are rotationally offset such that a line passing through a center of the disc and the main sector does not pass through the at least one extended sector.

22. The disc drive of claim 21, further including a head that accesses information on the at least one disc, wherein the disc drive has a rate of disc rotation, and wherein the controller includes means for arranging the plurality of sector sets so that the main sector and the at least one extended sector for each of the plurality of sector sets are rotationally offset by an amount that is dependent upon the rate of disc rotation and a seek rate for the head, such that a time period for rotation of the at least one disc to move from a first rotational position wherein the main sector is in line with the head to a second rotational position wherein the at least one extended sector is in line with the head is substantially equal to a time period for the head to complete a seek from the main sector to the at least one extended sector.

23. The disc drive of claim 18, wherein the controller includes means for storing information in each one of the main sectors that stores a block of information in the compressed state indicating that the one of the main sectors stores information that is in the compressed state.

24. The disc drive of claim 23, wherein the controller includes means for storing information in each one of the main sectors that stores a block of information in the compressed state indicating that the one of the main sectors stores information that is in the compressed state.

25. The disc drive of claim 18, wherein the controller includes means for arranging the plurality of sector sets by assigning a location on the at least one disc for each of the extended sectors that is on a different track than the corresponding main sector and is determined based upon a location on the disc of the corresponding main sector.

26. The disc drive of claim 18, wherein the disc drive system operates upon blocks of information having an uncompressed block size when in the uncompressed state, and when in the compressed state having a compressed block size that is determined by a minimum compression ratio, and wherein the controller has means for arranging each of the main and extended sectors to have a size that is substantially equal to the uncompressed block size divided by the minimum compression ratio.

27. The disc drive of claim 26, wherein the minimum compression ratio is equal to X:1, and wherein the controller includes means for arranging each of the plurality of sector sets to include a number of sectors equal to X.

28. The disc drive of claim 18, wherein for each of the extended sectors that corresponds to a main sector that stores a block of information in the compressed state, the controller includes means for maintaining the extended sector in the empty state when additional blocks of information are subsequently written to the at least one disc.

29. A method of managing a transfer of information from a first disc drive including a first storage disc to a second disc drive including a second storage disc, the first storage disc storing at least one byte of compressed information that was compressed prior to being stored on the first storage disc, the method comprising steps of:

(A) reading the at least one byte of compressed information from the first storage disc in its raw form, without decompressing the at least one byte of compressed information; and (B) writing the at least one byte of compressed information to the second storage disc in its raw form, without decompressing the at least one byte of compressed information.

30. The method of claim 29, wherein the first storage disc further stores at least one byte of uncompressed information that was not compressed prior to being stored on the first storage disc, and wherein the method further includes steps of:

(C) reading the at least one byte of uncompressed information from the first storage disc; and (D) writing the at least one byte of uncompressed information to the second storage disc without compressing the at least one byte of uncompressed information.

31. The method of claim 30, wherein the first disc drive executes a first command to read an uncompressed byte of information and a second command to read a compressed byte of information, wherein the at least one byte of compressed information includes a plurality of bytes of compressed information and the at least one byte of uncompressed information includes a plurality of bytes of uncompressed information, wherein the information to be transferred from the first storage disc to the second storage disc is stored within a range of addresses on the first storage disc, wherein the method further includes a step of querying the range of addresses to determine which bytes of information included therein are compressed and which are uncompressed, wherein step (A) includes a step of executing the first command to read each of the plurality of compressed bytes of information stored within the range of addresses, and wherein step (C) includes a step of executing the second command to read each of the plurality of uncompressed bytes of information stored within the range of addresses.

32. The method of claim 30, wherein the information to be transferred from the first storage disc to the second storage disc is stored at a range of addresses on the first storage disc that includes an address at which the at least one byte of uncompressed information is stored, wherein the at least one byte of uncompressed information is part of a logical block of information that includes first and second bytes of uncompressed information stored at addresses on the at least one disc that are not sequential, and wherein the method further includes a step of reading the range of addresses in sequential order so that the first and second bytes of uncompressed information are not read in consecutive read operations.

33. The method of claim 29, further including a step of, prior to performing steps (A) and (B), querying the at least one disc to determine whether the at least one byte of information is compressed.

34. The method of claim 29, wherein the second storage disc is a mirror of the first storage disc in a remote mirroring data facility.

35. The method of claim 29, wherein the second storage disc is a backup storage disc.

36. A storage subsystem having a maximum storage capacity that defines a maximum number of bytes of information passed to the storage subsystem than can be stored within the storage subsystem, the storage subsystem comprising:

at least one disc drive having a maximum storage capacity of C bytes for information that is uncompressed;

compression means for compressing information to be written to the at least one disc drive at a minimum compression ratio equal to at least 2:1; and a controller that controls the writing of information to the at least one disc drive so that the maximum storage capacity of the storage subsystem is limited to C bytes.

* * * * *